(12) United States Patent
Dörge et al.

(10) Patent No.: US 9,784,167 B2
(45) Date of Patent: Oct. 10, 2017

(54) EXHAUST PIPE (71) Applicant: BOSAL EMISSION CONTROL SYSTEMS NV, Lummen (BE)

(72) Inventors: Filip Dörge, Lummen (BE); Eric Hansenne, Soumagne (BE); Karel Vergote, Landen (BE); Meiko Wezenaar, Koersel (BE)

(73) Assignee: Bosal Emission Control Systems NV, Lummen (BE)

( * ) Notice: Subject to any disclaimer, the term of this patent is extended or adjusted under 35 U.S.C. 154(b) by 455 days.

(21) Appl. No.: 14/477,144

(22) Filed: Sep. 4, 2014

(65) Prior Publication Data
US 2015/0059913 A1    Mar. 5, 2015

(30) Foreign Application Priority Data

Sep. 5, 2013  (EP) ..................... 13183195

(51) Int. Cl.
| F15D 1/04 | (2006.01) |
| F16L 9/00 | (2006.01) |
| F01N 13/08 | (2010.01) |
| F01N 1/08 | (2006.01) |
| F16L 43/00 | (2006.01) |

(52) U.S. Cl.
CPC ............ *F01N 13/082* (2013.01); *F01N 1/08* (2013.01); *F01N 13/08* (2013.01); *F15D 1/04* (2013.01); *F01N 2470/10* (2013.01); *F01N 2470/20* (2013.01); *F16L 43/001* (2013.01)

(58) Field of Classification Search
CPC ................................ F01N 1/08; F01N 13/082

USPC ................................................... 138/39, 177
See application file for complete search history.

(56) References Cited

U.S. PATENT DOCUMENTS

| 5,332,873 A | | 7/1994 | Kullander et al. |
| 5,581,056 A | * | 12/1996 | Bellgardt .................. F01N 1/02 |
| | | | 181/265 |
| 6,141,958 A | * | 11/2000 | Voss .......................... F01N 3/02 |
| | | | 138/177 |

(Continued)

FOREIGN PATENT DOCUMENTS

| DE | 4228188 A1 | 3/1994 |
| DE | 19641100 A1 | 4/1998 |

(Continued)

OTHER PUBLICATIONS

European Search Report for EP Application No. 1318195.0 mailed Jan. 20, 2014 (7 pages).

*Primary Examiner* — Vishal Pancholi
(74) *Attorney, Agent, or Firm* — Merchant & Gould P.C.

(57) ABSTRACT

The exhaust pipe comprises an inlet pipe, an outlet pipe and a bend portion arranged between the inlet pipe and the outlet pipe. The bend portion comprises an inlet bend and an outlet bend, wherein a central bend portion defines an intermediate section of inlet bend and outlet bend and wherein the inlet bend and the outlet bend each cover 50 percent of the total bend angle covered by the bend portion. The central bend portion comprises a diameter, which is smaller than a diameter of the inlet bend and of the outlet bend in a bending plane. In addition a bend radius R of the bend portion varies along the bend portion such that a bend radius of the inlet bend is larger than a bend radius of the outlet bend.

19 Claims, 3 Drawing Sheets

(56) References Cited

U.S. PATENT DOCUMENTS

| | | | | |
|---|---|---|---|---|
| 6,390,142 B1* | 5/2002 | Naito | ............... | F16L 39/00 |
| | | | | 138/177 |
| 6,804,955 B2* | 10/2004 | Bassani | ............ | F01N 13/04 |
| | | | | 180/296 |
| 7,401,463 B2* | 7/2008 | Tsuruta | ............ | F01N 13/14 |
| | | | | 138/110 |
| 7,967,032 B2* | 6/2011 | Harada | ......... | F02B 29/0456 |
| | | | | 138/116 |
| 2008/0060870 A1 | 3/2008 | Rauch et al. | | |

FOREIGN PATENT DOCUMENTS

| | | |
|---|---|---|
| DE | 102009000090 A1 | 7/2010 |
| EP | 0935057 A | 8/1999 |
| GB | 2371334 A | 7/2002 |
| GB | 2409238 B | 7/2005 |
| JP | H03168312 A | 7/1991 |
| JP | 2002195030 A | 7/2002 |
| JP | 2005249170 A | 9/2005 |
| JP | 2007056716 A | 3/2007 |

* cited by examiner

EXHAUST PIPE

This application claims benefit of Serial No. 13183195.0, filed 5 Sep. 2013 in the European Patent Office and which application is incorporated herein by reference. To the extent appropriate, a claim of priority is made to the above disclosed application.

BACKGROUND

The invention relates to exhaust pipes for use in an exhaust system for combustion engines, for example of motor vehicles.

It is known that end pipes of exhaust systems for combustion engines for example of motor vehicles should be long in order to have a positive effect on sound attenuation with respect to low frequencies. Since space is limited in vehicles, pipes are bent. For example a pipe may be bent and a part of the pipe may be integrated inside a muffler while the remaining part of the pipe may be arranged outside of the muffler. It is also known that pipes with small diameters may improve the low frequent sound attenuation but may raise a flow velocity in the tube. However, bent pipes and fast flow velocities in pipes cause flow noise. Therefore, in prior art systems cross sections of a pipe in a bend are increased to reduce flow velocity. However, this has a negative effect on the low frequent sound attenuation. In other systems dividing plates are inserted into a bend such that the diameters of the divided pipes are reduced. However, these are more difficult to manufacture and the increased wetted surface and the introduction of additional edges reduce the potential pressure loss reduction and/or flow noise reduction. From further prior art it is known that there is a relationship between pressure loss in pipe bends and flow noise. By selecting an R/D ratio of at least 1.5 or larger for a pipe bend, pressure loss and flow noise is optimized. Therein, R is the bend radius and D is the diameter of the pipe. For example in DE 102009 000 090 a pipe bend with a constant bend radius R, with an oval cross section and a reduced diameter D in the bending plane has a R/D ratio of 3 or larger. The diameter of the pipe in the plane perpendicular to the bending plane may be slightly increased to partly compensate for the otherwise reduced cross section. However, to achieve large R/D ratios a small diameter of the pipe or a large bend radius is required. The former causes high flow noise and the latter does not allow to manufacture sharp bends and thus no compact arrangement of a bent pipe.

The exhaust pipe described in DE 10 2009 000 090 or other prior art still has drawbacks. Especially, prior art exhaust systems generally do not take into account differences in a flow entering a bend or leaving a bend. Therefore, there is still need for an improved exhaust pipe. Especially, there is need for such an exhaust pipe which provides an optimized bend structure with regard to pressure loss and flow noise.

SUMMARY

According to the invention, there is provided an exhaust pipe comprising an inlet pipe, an outlet pipe and a bend portion arranged between the inlet pipe and the outlet pipe. The bend portion comprises an inlet bend and an outlet bend, wherein a central bend portion is an intermediate section of inlet bend and outlet bend, and wherein the inlet bend and the outlet bend each cover 50 percent of the total bend angle covered by the bend portion. Therein, a smallest diameter of the bend portion measured in the bending plane is arranged in the central bend portion. In addition, a bend radius of the bend portion varies along the bend portion such that a bend radius of the inlet bend is larger than a bend radius of the outlet bend.

By reducing the diameter of the exhaust pipe in the bending plane in at least the central bend portion, a positive effect may be achieved with regard to low frequent sound attenuation and flow noise. A small diameter in the bend portion may also reduce the propagation of higher order modes, thus reducing flow noise at high frequencies. By providing a smaller diameter in a section of the bend portion and especially in the central bend portion only, desired effects may be achieved very locally. However, negative effects such as an overall increased flow velocity in the bend portion may be prevented. Small pipe diameters of the bend portion in the bending plane may for example be compensated in full or only partly by increasing the extension of the exhaust pipe in other directions, for example in a lateral direction, perpendicular to the radial direction in the bending plane.

Additionally providing an outlet bend with a bend radius which is smaller than a bend radius of the inlet bend takes into account the different flow behaviour of a fluid, preferably a gas such as an exhaust gas, of the fluid entering a bend and leaving a bend. Different bend radii in inlet and outlet bend have an influence on a detachment behaviour of a flow after having performed a certain turn. Especially, in U-turns the detachment of a fluid flow in the region in and after the bend, flow detachment may significantly add to flow noise in the exhaust pipe. By the larger bend radius of the inlet bend a fluid flow is guided and redirected in a more smooth way into and in the inlet bend of the bend portion. The smooth inlet bend with large bend radius prevents early flow detachment or may postpone flow detachment. The smaller bend radius of the outlet bend causes the bend portion to perform a sharper turn in the outlet bend. By this, a redirection of the fluid flow in the bend portion versus the outlet pipe is sharper and may be limited to a more local section of the bend. At the sharp outlet bend flow detachment can also be limited by adaptation of the cross sectional shape.

In the central bend portion, the smaller diameter combined with an adaption of the cross sectional shape of the bend portion in the central bend portion, allow to condition the flow for an optimal entry into the sharpest portion of the outlet bend.

One or several bend radii in the outlet bend may be chosen such that a flow direction in the outlet bend substantially corresponds to the flow direction in the outlet pipe already in a downstream end—or shortly thereafter—of the central bend portion. By this, no or no elevated flow noise is to be expected in this downstream section of the outer bend.

An inlet bend and an outlet bend may comprise one or several different bend radii. A bend radius of the bend portion may vary along the bend portion. The bend portion may comprise sections with constant bend radius. Preferably, local bend radii of the outlet bend are smaller than local bend radii of the inlet bend.

The exhaust pipe according to the invention has geometric parameters, which change along the length of the exhaust pipe. The geometric parameters are chosen to change along the bend portion of the exhaust pipe, at least partly in or along a central bend portion. Preferably, the exhaust pipe or the bend portion thereof respectively, undergoes a local change in geometric parameters. With a more localized adaption of the geometry of the exhaust pipe, the exhaust pipe according to the invention is optimized in view of low frequent sound attenuation, as well as in view of pressure loss and flow noise in the exhaust pipe. Due to a localization, sections with extreme values or values considered less favorable may be provided but the overall characteristics of the exhaust pipe may nevertheless be optimized. The overall characteristics may even be improved over bends in exhaust pipes with individually optimized features that are kept constant over an entire bend. Especially, different flow behaviour in inlet bend and outlet bend are considered in the exhaust pipe according to the invention by an asymmetric choice of geometric parameters, in particular of a different bend radius in the outlet bend than in the inlet bend.

Preferably, the exhaust pipe according to the invention is arranged inside a muffler or at locations in the exhaust system where important contributions are made to the total flow noise of the exhaust system. More preferably, the exhaust pipe according to the invention, especially the bend portion thereof, is optimized as end pipe in an exhaust system. Flow noise generated in pipe parts in a hot end of an exhaust system, such as for example in a manifold, in pipes right after an engine or in pipes in front of a catalytic converter, is sufficiently attenuated in downstream exhaust components, so that it does not contribute to the noise emitted from an open end of the exhaust system. Thus, hot end pipes are not designed to account for flow noise reduction. However, flow noise generated in a cold end of an exhaust system, closer to an open end of the exhaust system, such as in an end pipe, in a muffler or possibly also in a first pipe directly upstream of a muffler, is often not sufficiently attenuated in the remaining downstream exhaust components. So, it does not contribute to the noise emitted from an open end of the exhaust system. Therefore, in bent pipes arranged directly upstream or downstream of a muffler or for at least a part arranged inside a muffler, for example in end pipes, flow noise and the reduction thereof are to be considered, preferably by selecting an appropriate construction of the bent pipe and according the invention.

Preferably, end pipes in exhaust systems are arranged after a muffler, but may also be arranged partially or entirely inside a muffler.

The exhaust pipe according to the invention describes a bend of preferably larger than 90 degrees, more preferably of between about 160 degrees and 200 degrees. Thus, preferably the exhaust pipe substantially defines a U-turn, wherein a(n exact) U-turn is defined as forming a 180 degree bend. Preferably, inlet pipe and outlet pipe are straight pipes. Preferably, inlet pipe and outlet pipe are tubes with a circular cross section.

The term "bending plane" as used herein is the plane where the bend portion lies in. Also the bend radii of the bend portion lie in the bending plane. Generally, the bending plane divides the bend portion into two halves. Preferably, also inlet pipe or outlet pipe or both lie in the bending plane. In these embodiments, the bending plane divides the exhaust pipe into two halves. Each half then comprises half of the inlet pipe, half of the bend portion and half of the outlet pipe. Preferably, the bending plane is a symmetry plane of the bend portion, more preferably of the exhaust pipe or of sections thereof. The bending plane does not necessarily have to be a flat or even plane. Without departing from the scope of the invention, the bend portion, or the entire exhaust pipe according to the invention do not have to lie in an even plane or in the same plane respectively. Especially in exhaust systems, pipes are arranged to fit into limited space or between other devices such that no exactly planar orientation of the exhaust pipe or of parts thereof may be realized or is desired. By way of example only, a tilted inlet or outlet pipe (tilted with respect to a bend portion and out of the bending plane) or a bend portion twisted such as to not lie in a planar bending plane, may also be realized or arranged according to the invention. In preferred embodiments according to the invention, the bending plane is an even plane. This facilitates a manufacturing of the bend portion or the entire exhaust pipe.

The term "neutral line" as used herein is a line extending along the exhaust pipe, preferably in a center of the exhaust pipe. The neutral line defines a reference line in half of the distance between inner and outer bend curve of a bend portion, as well as between inner and outer peripheral line of inlet and outlet pipe. In the bend portion, neutral line, inner and outer bend curve lie in the bending plane. If the entire exhaust pipe lies in the bending plane, also the neutral line of the inlet and outlet pipes, as well as inner and outer periphery of the inlet and outlet pipe lie in the bending plane and are measured with respect to the bending plane. The neutral line is also the reference line for the local bend radii (neutral line is tangential to local bend radius) of the bend portion in the exhaust pipe according to the invention.

In an exhaust pipe having a circular cross section, which exhaust pipe defines a U-turn, also the neutral line defines a U-turn with a bend radius of $(Ri+Ro)/2$. Therein $Ri$ is the inner bend radius of the U-turn and $Ro$ is the outer bend radius of the U-turn.

Where reference is made to a radius or a diameter, these are always meant with reference to the bending plane if not explicitly mentioned otherwise or obviously indicating to different objects. Accordingly, a cross section of the exhaust pipe is meant as a cross section of the exhaust pipe perpendicular to and intersecting the neutral line. A bend radius is measured from the center of a circle to its perimeter, wherein the perimeter lies tangentially to the neutral line.

The term "midline" is herein used for a line defining the bisecting line between inlet pipe and outlet pipe at bend angles of basically larger than 0 degree, but preferably larger 90 degree and smaller 180 degree. In a 180 degree bend the midline is a line lying equidistantly between and parallel to a central line of inlet pipe and a central line of outlet pipe. Central lines of inlet and outlet pipes are the corresponding rotational axis of the pipes if the pipes are circular tubes. In an overall symmetric exhaust pipe the midline divides the bend portion into an inlet bend and an outlet bend. Inlet bend and outlet bend then are mirror symmetric pipe portions and each of the inlet and outlet bend covers 50 percent of the bend angle of the bend portion. In overall symmetric U-turns, inlet bend and outlet bend each cover 90 degree of the bend angle. The term "middle axis" is used in the exhaust pipe according to the invention to define the axis, which separates the inlet bend and the outlet bend such that inlet and outlet bend each cover 50 percent of the total bend angle of the exhaust pipe. However, in asymmetric exhaust pipes the middle axis lies parallel to the midline but may be shifted, typically into the direction of the outlet pipe.

A downstream end of the inlet bend is reached, as soon as 50 percent of the bend angle is reached for the first time. Due to the different bend radius of inlet bend and outlet bend and possibly locally varying bend radii, it might be that a bend angle changes to become a value corresponding to less than 50 percent of the bend angle (for example to slightly more than 90 degree in a 180 degree bend). However, such a local variation in the bend angle is compensated in further downstream portions of the outlet bend such that an overall bend angle covered by the outlet bend covers 50 percent of the total bend angle.

The bend portion is a section of the exhaust pipe, where the bend of the pipe starts or ends or preferably both. In a U-turn, the bend portion may be defined by the section of the exhaust pipe separated from the inlet pipe and from the outlet pipe by a straight separation line. This separation line lies in the bending plane and is arranged perpendicular to a midline or middle axis of the exhaust pipe and perpendicular to the neutral line of the exhaust pipe (in non-U-turns, two separation lines are present, one for each of the inlet bend and for the outlet bend. The two separation lines are perpendicular to the neutral line only). The separation line is positioned where the exhaust pipe starts to bend or stops to bend, or both, at respective transition positions. If the transition position in the inlet side of the exhaust pipe is arranged more upstream than the transition position in the outlet side of the exhaust pipe is arranged downstream, then the separation line lies on the transition position of the inlet side (and vice versa). In the outlet side of the exhaust pipe, the separation line then intersects the exhaust pipe at a position further downstream than the respective transition position, that is, the bend has already reached the desired bend angle further upstream in the outlet bend (and vice versa accordingly).

If neither inlet bend nor outlet bend comprise a substantially straight section directly arranged between the corresponding inlet or outlet pipe, the separation line lies on both transition positions.

A central bend portion defines a section of the bend portion describing a transitional portion between inlet bend and outlet bend. The central bend portion extends into the inlet bend and into the outlet bend to about 50 percent of the bend angle of each of the inlet bend and of the outlet bend, preferably to about 40 percent of the bend angle of each of the inlet and outlet bend. If the central bend portion comprises a straight section, preferably the central bend portion extends into the inlet and outlet bend to about 50 percent of the bend angle of inlet and outlet bend including the straight section. In 180 degree bends, inlet bend and outlet bend each cover 90 degrees of the bend angle. However, due to the asymmetry of the bend portion according to the invention, the length of the central bend portion in the inlet bend and the length of the central bend portion in the outlet bend need not be identical. A total length of an inlet bend may be larger than a total length of the outlet bend, such that a central bend portion may extend further into the inlet bend than into the outlet bend when measured in distance.

A straight section in a central bend portion has a limited length and is part of the bend portion containing the inlet bend and the outlet bend. Preferably, a straight section in the central bend portion covers a maximum of 20 to 30 percent, more preferably a maximum of 10 percent of the length of the central bend portion. The straight section may be entirely arranged in the inlet bend or entirely in the outlet bend, preferably entirely in the outlet bend.

According to an aspect of the exhaust pipe according to the invention, the bend portion is bent by about 160 degrees and 200 degrees. A bend portion, which is bent at an angle of between about 160 degrees and about 200 degrees, substantially performs a U-turn. Preferably, in U-turns, that is in bend portions bent by 180 degrees, inlet pipe and outlet pipe are arranged in parallel. With the bend portion performing a U-turn or substantially performing a U-turn, a very narrow arrangement of the exhaust pipe is facilitated. Also a serial arrangement of two or more exhaust pipes according to the invention may be provided. This serial arrangement provides a very compact set up of an exhaust pipe, especially an end pipe of an exhaust system of a motor vehicle.

In some preferred embodiments of the exhaust pipe according to the invention, a smallest bend radius is arranged between about 50 percent and about 85 percent of a total bend angle of the bend portion, preferably, between about 50 percent and about 75 percent, or between about 55 percent and 70 percent of the bend angle. The amount of percent of the bend angle are measured from an inlet of the bend portion or from the upstream end of the bend portion, respectively. In a bend portion in the form of a U-turn (180 degree bend) this substantially corresponds to a smallest bend radius, which is arranged between about 90 degree and about 150 degree, more preferably between about 90 degree and about 135 degree, for example between about 100 degree and 130 degree of the U-turn. The degree of the bend angle is also indicated from an upstream end of the bend portion. At the upstream end of the bend portion the angle is 0 degree and at the downstream end of the bend portion the angle is the maximum angle of the bend, that is, 180 degree in a bend performing a U-turn. By shifting a smallest bend radius to an outlet bend, that is, to a more downstream section of the bend portion with respect to a midline or middle axis, differences in flow characteristics between an inlet bend and an outlet bend are considered. Especially, a positive effect on flow detachment, thus on flow behaviour and flow noise in the outlet bend, is achieved. In addition, by a small bend radius in the outlet bend a sharp bend in the downstream section of the bend portion may be achieved. Preferably, a smallest bend radius is localized to a section in the bend portion, preferably a section downstream of the midline, more preferably downstream of a middle axis, and upstream of the downstream end of the central bend portion. By providing a smallest bend radius to a localized section only, one takes advantages of the small local bend radius, however without the drawbacks of small bend radii applied in extended pipe portions, such as flow detachment and flow noise associated therewith. A small diameter may extend along a substantially entire lateral extension of the bend portion (lateral with respect to the bending plane) such that the bend portion substantially has an oval shape. A small diameter may also extend only partially into the lateral direction.

According to another aspect of the exhaust pipe according to the invention, a largest cross section of the bend portion is arranged in the central bend portion. The section with the largest cross section may correspond to the entire central bend portion. Advantageously, the section with the largest cross section corresponds to a part of the central bend portion only. Preferably, the section with the largest cross section substantially overlaps with the section of the exhaust pipe with the smallest diameter. Preferably, a large cross section is achieved by enlarging the bend portion in a lateral direction (perpendicular to the radial direction in the bending plane).

Preferably, a largest cross section is largest with respect to the cross section of the entire bend portion, advantageously with respect to the cross section of the entire exhaust pipe. By providing a large or largest cross section in the bend portion flow velocity, flow detachment and flow noise may be decreased. Since providing small diameters generally increase flow velocity and flow noise, the large cross section provided in the bend portion may lessen adverse effects of the small diameter of the exhaust pipe.

According to another aspect of the exhaust pipe according to the invention, the outlet bend including the central bend portion comprises a R/d ratio of smaller than 1.5, for example smaller or equal than 1. Therein d is the diameter of the exhaust pipe measured in the bending plane. With a small R/d ratio small bend radii are achievable thus allowing to construct sharp bends and to manufacture compact exhaust systems.

In addition, small diameters in the bending plane may reduce flow detachment. Both features are most favorable if provided in the bend portion, preferably in an outlet bend or in the central bend portion. A small R/d ratio is preferably provided in some parts of the respective bend portion only. Thereby, the other portions of the bend portion may be optimized to other bend characteristics in order to get an overall optimization of the bend portion. A R/d ratio of smaller than 1.5 may extend over up to 60 percent, preferably up to 40 percent of the bend angle of the outlet bend including the central bend portion. In some embodiments, up to 50 percent of the central bend portion has a R/d ratio of smaller than 1.5. In some embodiments, up to the entire length of the central bend portion of the outlet bend comprises a R/d ratio smaller than 1.5, for example between to 100 percent of the bend angle of the central bend portion of the outlet bend.

Advantageously, a R/d ratio of 1 or smaller is provided over a small section of the outlet bend or over the central bend portion only. Preferably, a R/d ratio smaller than 1 is arranged in the central bend portion of the outlet bend only. For example, the central bend portion of the outlet bend comprises a R/d value of 1 or smaller over a range between about 1 percent and 30 percent of the bend angle of the central bend portion of the outlet bend, preferably over a range between 5 percent and 20 percent.

Preferably, an average R/d ratio of the inlet bend is larger than an average R/d ratio of the outlet bend.

From prior art it is known that a bend with a R/D ratio of 1.5 or larger is superior in view of pressure loss and flow noise compared to bends with an R/D ratio of less than 1. However, due to the structure of the exhaust pipe according to the invention and as described herein, it has been found that localized sections of the bend portion may have R/d ratios of smaller than 1.5 or even smaller than 1. Due to the localized application of extreme values or values considered less favorable, the overall characteristics of the exhaust pipe is optimized and improved over prior art bends in exhaust pipes.

According to another aspect of the exhaust pipe according to the invention, the bend portion is symmetric with respect to the bending plane. The bending plane as symmetry plane for the bend portion allows a certain regularity in the flow of a fluid in the flow direction of the bend portion or preferably in the entire exhaust pipe. Advantageously, the bending plane is a symmetry plane for the exhaust pipe including the bend portion as well as the inlet and outlet pipe. A symmetric arrangement also allows for the manufacturing of the bend portion or the exhaust pipe, respectively, from for example two half shells which may be mirror images of each other. Two half shells may be fixed together to form an exhaust pipe, for example by welding or by mechanical locking.

According to a further aspect of the exhaust pipe according to the invention, an inner bend curve and an outer bend curve of the inlet bend and of the outlet bend measured along the bending plane are not axially symmetric to each other with respect to a midline or middle axis, respectively, between inlet pipe and outlet pipe. Therein, the inner bend curve of the inlet bend is not axially symmetric with the inner bend curve of the outlet bend and the outer curve of the inlet bend is not axially symmetric with the outer curve of the outlet bend.

Locally differing pipe parameters and dimensions, such as for example bend radius, diameter or cross section over the length of a bend portion, are provided such that inlet bend and outlet bend have different inner bend curves and outer bend curves at least when measured in the bending plane. The provision of a small or smallest bend radius of the bend portion in a downstream side of the bend portion or in the central bend portion of the outlet bend may provide more smooth and more regular inner and outer bend curves of an inlet bend than inner and outer bend curves of an outlet bend.

According to another aspect of the exhaust pipe according to the invention, the inlet bend comprises a ridge-like protrusion extending along an outer periphery of the inlet bend. The ridge-like protrusion is arranged in the bending plane extending to a small extent to both sides of the bending plane and may be symmetric with respect to the bending plane. A ridge-like protrusion provides an expansion space for the fluid flow flowing into the bend portion. Preferably, the ridge-like protrusion follows along the inlet bend and advantageously starts at the upstream end of the inlet bend and extends into the central bend portion. Preferably, the ridge-like protrusion does not extend to the downstream end of the inlet bend.

According to another aspect of the exhaust pipe according to the invention, the outlet bend comprises a dent extending along an inner periphery of the central bend portion of the outlet bend. The dent is arranged in the bending plane extending somewhat to both sides of the bending plane and may be symmetric with respect to the bending plane. A dent in an outlet bend influences the flow behaviour, especially it may reduce detachment of the fluid flow in an outlet bend. Preferably, the dent is arranged in at least a first half of the outlet bend. The dent may be arranged at least partly in the central bend portion of the inlet bend adjacent the middle axis and may extend further into the outlet bend. Preferably, the dent does not extend until the most downstream end of the outlet bend. Preferably, the dent has a smooth structure, at least in a flow direction, in order to reduce a flow resistivity. Preferably, the dent is designed such as to provide a substantially laminar flow in the bend portion around the dent, preferably such as to minimize flow detachment and recirculation.

The bend portion, or also the exhaust pipe, may be provided with further protrusions or dents or both. Preferably, such further dents or protrusions are arranged to direct in a longitudinal or flow direction in the bend portion. Preferably, such dents or protrusions are arranged symmetrically with respect to the flow direction.

According to another aspect of the exhaust pipe according to the invention, an outer bend curve of the outlet bend substantially is a prolongation of an outer peripheral line of the outlet pipe in the downstream region of the outlet bend. Therein, outer bend curve and outer peripheral line are preferably both measured in the bending plane. If the outer bend curve of the outlet bend substantially is a prolongation of the outer peripheral line of the outlet pipe, the outlet bend and the outlet pipe may become similar or identical in diameter and flow direction at least in a downstream region of the outlet bend. Due to the longer substantially same direction of the flow in the outlet pipe and in a downstream region of the outlet bend, the outlet bend performs a sharp turn, preferably already in the central bend portion. After the sharp turn, advantageously the flow direction substantially corresponds to the flow direction in the outlet pipe arranged downstream of the outlet bend. Preferably, the outlet pipe is a straight pipe such that an outer bend curve of the downstream region of the outlet bend also describes a substantially straight curve.

According to other embodiments of the exhaust pipe according to the invention, the outer bend curve of the outlet bend extends radially over an outer peripheral line of the outlet pipe, preferably in a downstream region of the outlet bend. In these embodiments, the bend portion describes a protruding curve in the outlet bend with respect to a symmetric bend with a constant bend radius. Preferably, the radial extension of the outer bend curve over the outer peripheral line of the outlet pipe is less than 80 percent with respect to a distance between central axis, or neutral line, respectively, and outer periphery of the outlet pipe, more preferably less than 40 percent.

According to another aspect of the exhaust pipe according to the invention, the central bend portion comprises a straight section. A straight section in the central bend portion allows more flexibility in the design and arrangement of inlet bend and outlet bend, especially with bends with large bend angles, for example bends in the form of a U-turn. A straight section in the central bend portion may also provide a certain stabilization or pre-conditioning of the flow after having passed the inlet bend and before entering the outlet bend.

According to a further aspect of the exhaust pipe according to the invention, a size of a cross section varies between at least one of the inlet pipe, the bend portion and the outlet pipe. Preferably, the size of the cross section of the exhaust pipe varies along the length of the exhaust pipe. Preferably, the size of a cross section varies between bend portion and inlet and outlet pipe. Preferably, the sizes of the cross sections of inlet and outlet pipe are identical. However, the sizes of the cross sections between inlet and outlet pipe may vary. Preferably, the sizes of inlet pipe and outlet pipe vary in a range of maximal up to 20 percent, for example in a range of up to 5 to 15 percent. The size of a cross section may vary between the individual portions of the exhaust pipe and also within the bend portion, within the inlet pipe and within the outlet pipe. Preferably, the size of the cross section of the bend portion varies along the length of the bend portion.

The exhaust pipe according to the invention may for example be used in an exhaust system of an engine, preferably of a motor vehicle. An exhaust system comprises at least one of the exhaust pipes according to the invention. Preferably, the exhaust pipe according to the invention is arranged inside a muffler or at locations in the exhaust system where important contributions are made to the total flow noise of the exhaust system.

BRIEF DESCRIPTION OF THE DRAWINGS

The invention is further described with regard to some embodiments, which are illustrated by means of the following drawings. Wherein.

DETAILED DESCRIPTION

Figure 1:
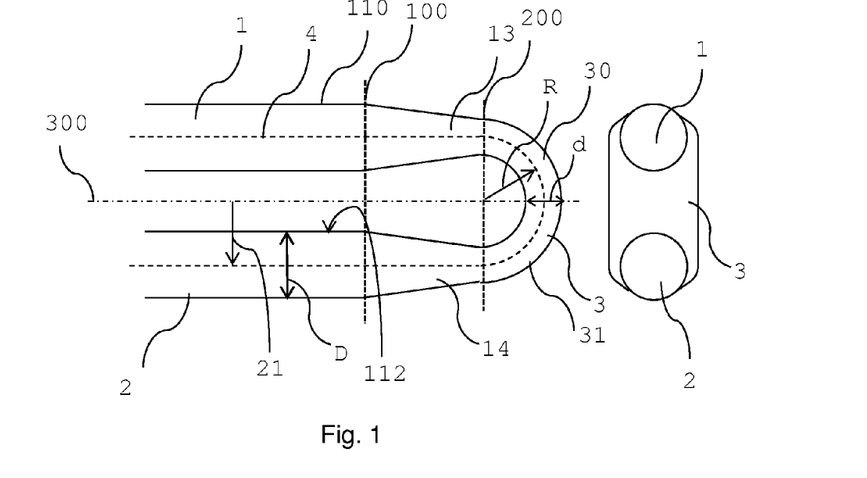
FIG. 1 shows an exhaust pipe with reduced diameter in the bend portion and a constant bend radius.

In FIG. 1 a cut through an exhaust pipe with circular inlet pipe 1, circular or oval bend portion 3 and circular outlet pipe 2 along the even bending plane of the exhaust pipe is shown. The exhaust pipe comprises a 180 degree U-turn and is mirror symmetrical with respect to midline 300, that is, with respect to an inlet and outlet side of the exhaust pipe. The neutral line 4 of the exhaust pipe indicates the central axis along the pipe. The neutral axis 4 is equally distanced from an outer peripheral line 110 and an inner peripheral line 112 of the exhaust pipe, corresponding to an inner bend curve and an outer bend curve in the bend portion 2. In the inlet pipe 1 and the outlet pipe 2, the neutral line 4 corresponds to the rotational axis of the pipes. Inlet and outlet pipe 1,2 are straight pipes with a same diameter D. The bend portion 3 has a smaller diameter d in the bending plane (corresponding to the drawing plane) than diameter D of the inlet and outlet pipes 1,2. Accordingly, conically shaped transition sections 13,14 between lines 100 and 200 are arranged between inlet pipe 1 and bend portion 3, as well as between bend portion 3 and outlet pipe 2. The bend portion 3 is divided into an inlet bend 30 and an outlet bend 31, which are also symmetric with respect to midline 300. Inlet bend 30 extends from line 200, or from the downstream end of transition section 13, to midline 300. Outlet bend 31 extends from midline 300 to line 200 or to the upstream end of transition section 14, respectively. Each of the inlet bend and outlet bend cover 90 degree of the 180 degree bend angle. The bend radius R of the bend portion 3 is constant and has the same length than a 'radius' of the inlet and outlet pipes, respectively. Such 'radius' corresponds to the distance 21 between midline 300 and neutral line 4.

On the right hand side of FIG. 1 a view onto the bend portion 3 of the exhaust pipe of FIG. 1 cut along line 100 is shown. The bend portion has a constant oval cross section along the bend portion. In order for compensating the reduced diameter in the bend portion, the lateral extension of the bend portion into a direction perpendicular to the bending place is enhanced such as to slightly exceeding the diameter D of the inlet and outlet pipes in the lateral direction.

Figure 2:
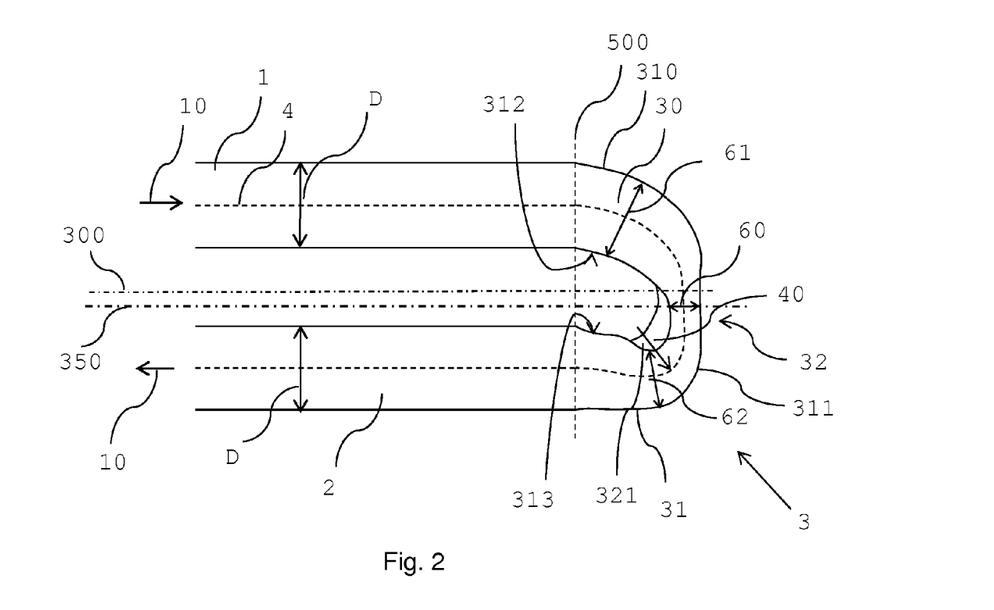
FIG. 2 shows an embodiment of an exhaust pipe according to the invention.

In FIG. 2 a view onto a cut through an exhaust pipe along its even bending plane is shown. The exhaust pipe comprises straight inlet and outlet pipes 1,2 and a bend portion 3 arranged between inlet and outlet pipe 1,2. Inlet and outlet pipes 1,2 are arranged in parallel such that the exhaust pipe makes a U-turn of 180 degree. Bend portion 3 is separated from the inlet pipe 1 and the outlet pipe 2 by separation line 500. The separation line 500 is perpendicular to midline 300 (and middle axis 350 see below) and intersects the exhaust pipe at a position where the exhaust pipe starts to bend and at a position where the exhaust pipe stops bending.

The bend portion 3 is not symmetric with respect to the midline 300. Midline 300 describes the center line between inlet and outlet pipe 1,2 and is arranged equidistantly from inlet and outlet pipe 1,2. Therefore, the bend portion is divided into inlet bend 30 and outlet bend 31 by middle axis 350 and not by midline 300. If divided by middle axis 350, inlet bend 30 and outlet bend 31 each cover 90 degree of the total bend angle, corresponding to 50 percent of the bend angle also in bends with more or less than 180 degree bend angle. The middle axis 350 lies parallel to midline 300 but is shifted to an outlet side of the bend portion 3. Inlet bend 30 extends from separation line 500, i.e. from the downstream end of the inlet pipe 1 to the middle axis 350. Outlet bend 31 extends from the middle axis 350 to separation line 500, i.e. to the upstream end of outlet pipe 2. A flow direction is indicated by arrows 10.

Inlet and outlet pipes 1,2 have the same diameter D. Inlet bend 30 and outlet bend 31 have varying diameters 61,60,62 over the length of the respective bend portions. A smallest diameter 60 is arranged in a central bend portion 32 of the bend portion, here on the middle axis 350. The central bend portion 32 extends from the middle axis 350 to an upstream and to a downstream side into the inlet bend 30 and into the outlet bend 31, preferably to about 50 percent of the respective bends. The smallest bend radius 40 is arranged in the outlet bend 31, for example in a range between about 20 percent and 60 percent of the outlet bend, for example between 30 and 45 percent of the outlet bend of the bend angle, respectively when measured from middle axis 350.

The outlet bend 31 performs a sharper turn than the inlet bend 30. A fluid flows in an inlet flow direction into the inlet bend. The fluid flows rather evenly through the inlet bend 30 and is then redirected into an opposite outlet flow direction in the outlet bend 31 in a more abrupt way. Due to generally smaller bending radii in the outlet bend 31 than in the inlet bend 30, a flow direction may correspond to the straight flow direction in the outlet pipe 2 already in a downstream section of the outlet bend 31 close to separation line 500. By this, low or no flow detachment and thus no or no elevated flow noise is to be expected in this downstream section of the outer bend 31.

Due to the asymmetric arrangement of inlet bend 30 and outlet bend 31 also respective inner bend curves 312,313 and respective outer bend curves 310,311 are asymmetric to each other with respect to the middle axis 350.

Preferably, the bend portion 3 is symmetric with respect to the bending plane, which corresponds to the drawing plane in this embodiment. Also inlet and outlet pipe 1,2 lie in the bending plane and are preferably symmetric with respect to the bending plane.

In the central bend portion 32 and the outlet bend 31 a dent 321 provided on the inner side of the bend portion 3 may be seen. In the section of the bend portion provided with the dent, the diameter of the bend portion is small in the bending plane 600 but is enlarged in more lateral regions of the bend portion 3. The dent 321 is formed by smooth wall portions, at least in a flow direction, such as to minimize flow detachment.

Figure 3:
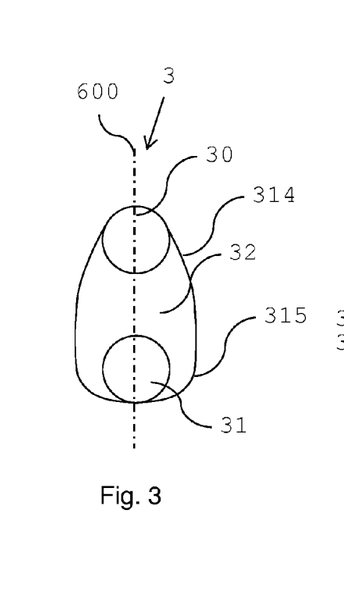
FIG. 3 shows a view onto the exhaust pipe of FIG. 2 cut along line 500.

FIG. 3 shows the view onto the bend portion 3 of for example the exhaust pipe of FIG. 2 cut along separation line 500 with circular inlet and outlet pipes. The most upstream end of the inlet bend 30 has the circular cross section of the inlet pipe 1. The most downstream end of the outlet bend 31 has the circular cross section of the outlet pipe 2. The lateral extension of the bend portion (perpendicular to the bending plane 600) shows a continuous increase 314 until about a position corresponding to a position little upstream of midline 300 of FIG. 2. Going further downstream, the lateral extension remains substantially constant in the central bend portion 32 until the outlet bend 31 reaches the level 315 of the outlet pipe. The outlet bend 31 then performs a sharp turn, while the lateral extension continuously decreases to the lateral extension of the outlet pipe. The cross section of the bend portion may substantially be oval, however, may be provided with a dent 321 or with protrusion as describe in FIG. 6. The bend portion 3 is symmetric with respect to the bending plane indicated by line 600.

Thus a fluid flows into the inlet bend of the bend portion rather smoothly, but is being prepared for the outlet bend and the sharper bend therein. Thereby, flow detachment, especially early flow detachment, may be prevented or flow detachment may be postponed.

Figure 4:
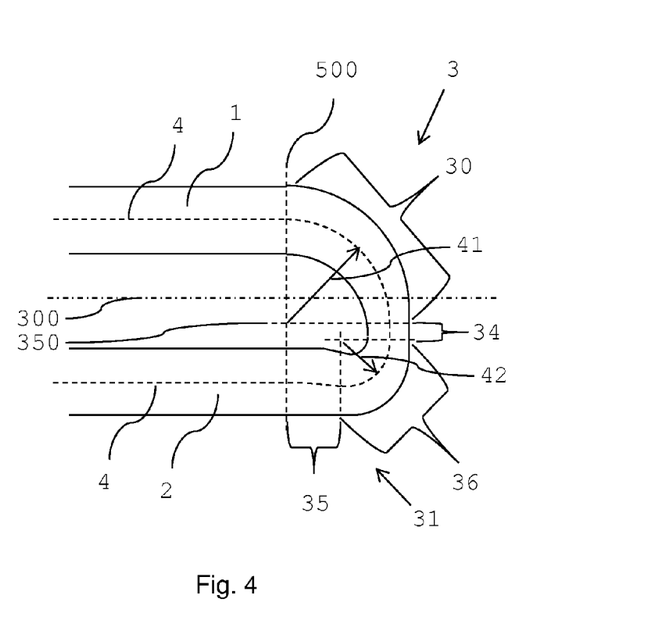
FIG. 4 is a schematic drawing of an embodiment of the exhaust pipe according to the invention with one bend radius in inlet bend and in outlet bend.

FIG. 4 is a schematic drawing of an embodiment of an exhaust pipe according to the invention with one bend radius 41 per inlet bend 30 and one bend radius 42 per outlet bend 31. The one radius 42 of the outlet bend corresponds to the smallest bend radius. Separation line 500 again indicates the transition between inlet and outlet pipes 1,2 and bend portion 3. Separation line 500 again is arranged perpendicular to neutral line 4 and intersects the inlet part of the exhaust pipe at the position where the exhaust pipe starts to bend. Due to a straight section 35 arranged in the outlet bend 31 (described below) the outlet bend has already performed its complete bend when the separation line 500 intersects the outlet part of the exhaust pipe.

Bend radius 41 of inlet bend 30 corresponds to the distance of the neutral line 4 (rotational axis for a circular pipe) of the inlet pipe 1 and the middle axis 350. The bend portion 3 comprises a straight section 34, which is arranged in the central bend portion 32 adjacent to the inlet bend 30. The straight section 34 forms part of the outlet bend 31. The outlet bend 31 comprises a section 36 with an outlet bend radius 42, which is smaller than the bend radius 41 of the inlet bend 30. The outlet bend also comprises a substantially straight section 35 arranged adjacent the bend section 36 and directly upstream of separation line 500, i.e. adjacent to the outlet pipe 2 in an upstream direction.

The embodiment of FIG. 4 is realized with a middle axis 350 separating inlet bend and outlet bend. However, also embodiment with one inlet bend radius 41 and one outlet bend radius 42 may be realized, where inlet bend and outlet bend are separated by midline 300, which is not shifted to the outlet side of the exhaust pipe as middle axis 350.

Figure 5:
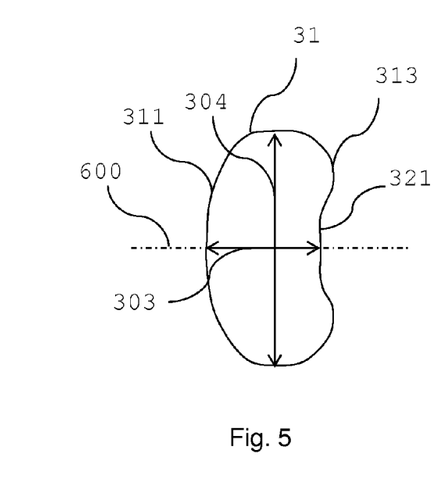
FIG. 5,6 show peripheral lines of cross sections of an outlet bend (FIG. 5) and of an inlet bend (FIG. 6)
Figure 6:
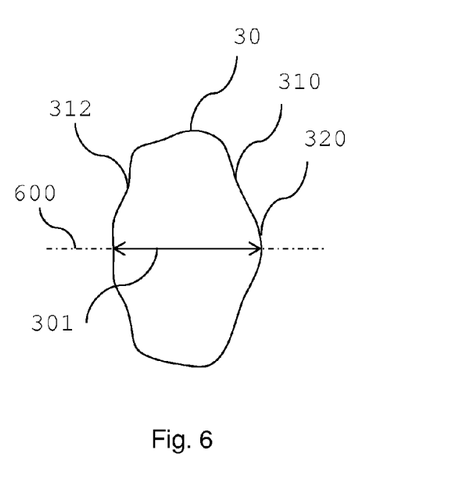

FIG. 5 and FIG. 6 show the outer periphery of a cross section through an outlet bend 31 and through an inlet bend 30, for example of the embodiment shown in FIG. 2. The cross sections are cuts through a plane perpendicular to the neutral line 4, which extends from and into the drawing plane.

The cross section of FIG. 5 shows the outer form of the exhaust pipe in a downstream region of the central bend portion. While the pipe form is generally oval, the inner bend curve 313 comprises a dent 321. The dent 321 may extend about halfway into the direction of the neutral line or radially inwardly, respectively. The dent 321 also extends to both sides into a lateral direction, lateral with respect to the bending plane 600. Along a certain length of the exhaust pipe in the central bend portion of the outlet bend, the diameter 303 of the outlet bend may be about half the lateral extension 304 of the outlet bend as shown in FIG. 5.

The cross section of FIG. 6 shows the outer form of the exhaust pipe in an upstream region of the inlet bend. The outer bend curve 310 comprises a protrusion 320. The protrusion 320 may extend like a ridge along the pipe from substantially the upstream end of the inlet pipe into the direction of the midline or middle axis, respectively. The ridge 320 also extends into a lateral direction, lateral with respect to the bending plane 600.

The cross sections shown in FIG. 5 and FIG. 6 are symmetric with respect to the bending plane 600.

Figure 7:
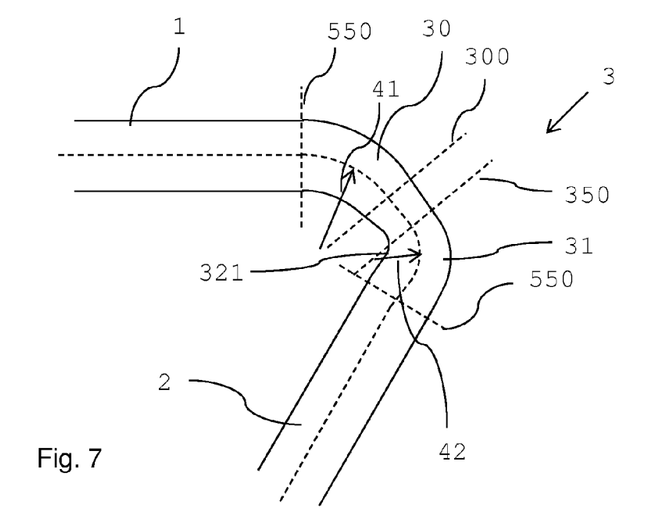
FIG. 7 shows an embodiment of the exhaust pipe bent by 135 degree.

In FIG. 7 an exhaust pipe is shown, wherein a bend portion 3 performing a 135 degree angle is arranged between inlet pipe 1 and outlet pipe 2. Inlet bend 30 and outlet bend 31 are separated by middle axis 350, which is parallel to midline 300 but again shifted to the downstream region of the exhaust pipe. Separation lines 550 indicate the beginning and the end of the bend portion. The inlet bend 30 has a larger bend radius 41 than the radius 42 of the outlet bend. A dent 321 is provided downstream of the midline 300.

Figure 8:
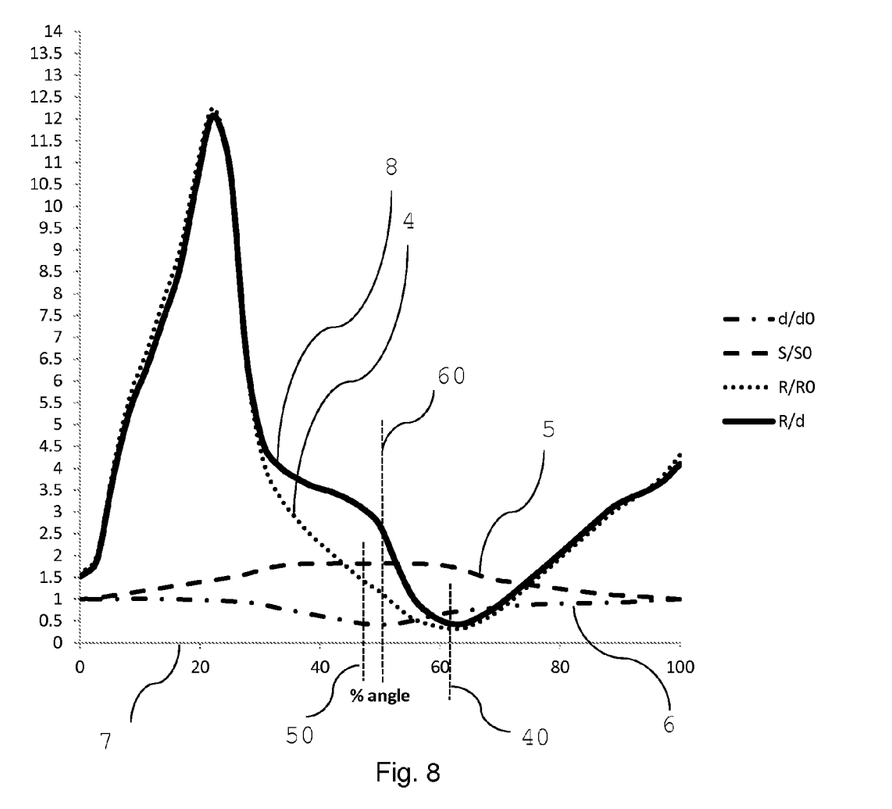
FIG. 8 shows the behavior of several bend parameters of an embodiment of a 180 degree U-turn exhaust pipe.

In FIG. 8 bend parameters such as bend radius R, diameter d, cross section S and the R/d ratios are drawn for an embodiment of an exhaust pipe, preferably performing a U-turn, for example of an embodiment similar to the one shown in FIG. 2. All parameters are measured in the bending plane and may vary for the bend portion outside of the bending plane. Along the bottom axis 7 values for the bend portion from 0 percent of a bend angle to 100 percent of a bend angle, that is, from the inlet of the inlet bend to the outlet of the outlet bend are indicated. The drawn curves are scaled or normalized to the respective values d0 (diameter), S0 (cross section), R0 (radius) of the inlet pipe before the beginning of the bend portion. Curve 5 represents the cross section and curve 6 represents the diameter of the bend portion in the bending plane. A smallest diameter 60 in the bending plane substantially coincides with the largest cross section 50 at the same location in the bend portion. This is favorable, since the small diameter and the large diameter have positive effects on low frequent sound attenuation and flow noise. Smallest diameter 60 and largest cross section 50 are basically arranged at about 50 percent of the bend angle. The smallest diameter 60 is a more localized value around 50 percent of the bend angle compared to the largest cross section. The largest cross section extends to about 20 to 30 percent of the bend angle around half the bend, i.e. around 50 percent. The largest cross section 50, or a center thereof, is arranged a few percent before, i.e. upstream of, the 50 percent position of the bend, for example at around 45 percent. The curves for the diameter 6 and the cross section 5 are not symmetric with respect to the middle of the bend at 50 percent. The cross section grows more rapidly versus the 50 percent, that is, in the inlet bend and decreases later in the outlet bend, for example only after 60 percent of the bend angle. The diameter 6 decreases more progressively in the inlet bend versus the 50 percent and decreases in the outlet bend right after 50 percent of the bend angle.

Curve 4 indicates the local bend radii of the bend portion. Generally, the outlet bend has smaller bend radii than the inlet bend. Especially, a smallest bend radius 40 is shifted versus the outlet bend, i.e. to a region >50 percent, to a region between about 55 percent and about 65 percent of the bend angle. Large bend radii in the inlet bend are arranged between around 5 and 35 percent of the bend angle.

Also depicted in the chart is a curve 8 for the R/d ratio for an embodiment of the bend portion according to the invention. Curve 8 mainly follows curve 4 for the bend radii. That is, the inlet bend has on average larger R/d ratios than the outlet bend. R/d ratios of larger than 1.5, locally also up to 12, are present in the inlet bend. More extended sections of the outlet bend have a R/d ratio of smaller than 1,5, even 1 or smaller than 1, locally about 0.5. The section with a R/d ratio of smaller than 1.5 extends from about 53 percent to about 75 percent of the bend angle. An R/d smaller than 1 completely lies in the central bend portion of the outlet bend from about 55 percent to about 70 percent of the bend angle.

The most significant differences of the behaviour of the bend radius 4 or also the diameter 6 and the R/d ratio 8 occur in the central bend portion. A significant difference between the behaviour of the bend radius 4 and the R/d ratio 8 may be seen between about 30 percent and 60 percent of the bend angle. Especially, in a region at about 40 percent, the bend radius already decreases to reach its minimum value 40 at around 60 percent, while the R/ratio is still larger than 1.5 up to 50 percent of the bend angle. Thus a minimum in diameter that is reached before a minimum in the bend radius is reached leads to different slopes between curve 4 for the bend radii and curve 8 for the R/d ratio.

The invention claimed is:

1. Exhaust pipe comprising an inlet pipe, an outlet pipe and a bend portion arranged between the inlet pipe and the outlet pipe,
   the bend portion comprising an inlet bend and an outlet bend, wherein a central bend portion is an intermediate section of inlet bend and outlet bend and wherein the inlet bend and the outlet bend each cover 50 percent of the total bend angle covered by the bend portion,
   wherein the central bend portion extends into the inlet bend and into the outlet bend to about 50 percent of the bend angle of the inlet bend and of the outlet bend,
   wherein a smallest diameter of the bend portion measured in the bending plane is arranged in the central bend portion, and
   wherein a bend radius of the bend portion varies along the bend portion such that a bend radius of the inlet bend is larger than a bend radius of the outlet bend.

2. The exhaust pipe according to claim 1, wherein the bend portion is bent by about 160 degrees to 200 degrees.

3. The exhaust pipe according to claim 1, wherein a smallest bend radius is arranged between about 50 percent and about 85 percent of a total bend angle of the bend portion.

4. The exhaust pipe according to claim 1, wherein a largest cross section of the bend portion is arranged in the central bend portion.

5. The exhaust pipe according to claim 1, wherein the outlet bend including the central bend portion comprise a R/d ratio of smaller than 1.5, where d is a diameter of the exhaust pipe measured in the bending plane, and wherein R is a radius of the bend portion taken at the same location as d.

6. The exhaust pipe according to claim 1, wherein the bend portion is symmetric with respect to the bending plane.

7. The exhaust pipe according to claim 1, wherein an inner bend curve and an outer bend curve of the inlet bend and of the outlet bend measured along the bending plane are not axially symmetric to each other with respect to a midline or a middle axis between inlet pipe and outlet pipe.

8. The exhaust pipe according to claim 1, wherein the inlet bend comprises a ridge-like protrusion extending along an outer periphery of the inlet bend.

9. The exhaust pipe according to claim 1, wherein the outlet bend comprises a dent extending along an inner periphery of the central bend portion.

10. The exhaust pipe according to claim 1, wherein an outer bend curve of the outlet bend substantially is a prolongation of an outer peripheral line of the outlet pipe in a downstream region of the outlet bend.

11. The exhaust pipe according to claim 1, wherein the central bend portion comprises a straight section.

12. The exhaust pipe according to claim 1, wherein an outer bend curve of the outlet bend extends radially over an outer peripheral line of the outlet pipe.

13. The exhaust pipe according to claim 1, wherein a size of a cross section varies between at least one of the inlet pipe, the bend portion and the outlet pipe.

14. The exhaust pipe according to claim 1, being an end pipe of an exhaust system.

15. The exhaust system comprising at least one of the exhaust pipe according to claim 1.

16. The process of using the exhaust pipe according to claim 1 in an exhaust system of a combustion engine.

17. The process of using the exhaust pipe according to claim 16 as an end pipe in an exhaust system of a combustion engine of a motor vehicle.

18. The exhaust pipe according to claim 3, wherein the outlet bend including the central bend portion comprise a R/d ratio of smaller than 1.5, where d is a diameter of the exhaust pipe measured in the bending plane, and wherein R is a radius of the bend portion taken at the same location as d.

19. The exhaust pipe according to claim 18, being an end pipe of an exhaust system.

\* \* \* \* \*